(12) United States Patent
Rahman et al.

(10) Patent No.: US 8,037,022 B2
(45) Date of Patent: Oct. 11, 2011

(54) SYNCHRONIZING CONTENT BETWEEN CONTENT DIRECTORY SERVICE AND CONTROL POINT

(75) Inventors: Mahfuzur Rahman, Santa Clara, CA (US); Wonseok Kwon, Mangpo-Dong (KR)

(73) Assignee: Samsung Electroncis Co., Ltd., Suwon (KR)

( * ) Notice: Subject to any disclaimer, the term of this patent is extended or adjusted under 35 U.S.C. 154(b) by 622 days.

(21) Appl. No.: 11/965,555

(22) Filed: Dec. 27, 2007

(65) Prior Publication Data

US 2008/0307246 A1  Dec. 11, 2008

Related U.S. Application Data

(60) Provisional application No. 60/933,416, filed on Jun. 5, 2007.

(51) Int. Cl.
   *G06F 17/30* (2006.01)
(52) U.S. Cl. .......................................... 707/613
(58) Field of Classification Search ................... 707/613
   See application file for complete search history.

(56) References Cited

U.S. PATENT DOCUMENTS

| | | | |
|---|---|---|---|
| 6,351,467 B1 * | 2/2002 | Dillon | 370/432 |
| 2002/0103804 A1 * | 8/2002 | Rothschild et al. | 707/10 |
| 2004/0133896 A1 * | 7/2004 | Lym et al. | 719/315 |
| 2004/0136404 A1 | 7/2004 | Mahonen et al. | |
| 2004/0139180 A1 * | 7/2004 | White et al. | 709/221 |
| 2005/0021866 A1 | 1/2005 | Kang et al. | |
| 2006/0161635 A1 * | 7/2006 | Lamkin et al. | 709/217 |
| 2006/0190572 A1 * | 8/2006 | Novik et al. | 709/220 |
| 2007/0088764 A1 * | 4/2007 | Yoon et al. | 707/201 |
| 2007/0226312 A1 * | 9/2007 | Stirbu et al. | 709/217 |

FOREIGN PATENT DOCUMENTS

| | | |
|---|---|---|
| WO | WO 02/080015 | 10/2002 |
| WO | WO 03/107597 | 12/2003 |

OTHER PUBLICATIONS

"Universal Plug and Play", wikipedia.org, Apr. 27, 2008, 7 pages http://en.wikipedia.org/wiki/Universal_Plug_and_Play.
International Search Report and Written Opinion in PCT/KR2008/003146 Dated Oct. 20, 2008.

* cited by examiner

*Primary Examiner* — James Trujillo
*Assistant Examiner* — William Spieler
(74) *Attorney, Agent, or Firm* — Beyer Law Group LLP

(57) ABSTRACT

In one embodiment, a method is performed at a control point (CP) in a network. An action is invoked to create a synchronization data structure on a media server that includes a content directory service (CDS) in the network, wherein the synchronization data structure includes a synchronization relationship describing a relationship between the CP and the CDS. Then an action is invoked to add synchronization pair information to one or more objects on the CDS. A change log is requested from the CDS. Then the change log is received from the CDS, wherein the change log contains information about changes to the one or more objects to which synchronization pair information for the CP was added.

26 Claims, 7 Drawing Sheets

SYNCHRONIZING CONTENT BETWEEN CONTENT DIRECTORY SERVICE AND CONTROL POINT

CROSS-REFERENCE TO RELATED APPLICATION

This application claims priority to U.S. Provisional Application 60/933,416, entitled "SYNCHRONIZING CONTENT BETWEEN UPnP CONTENT DIRECTORY SERVICE AND CONTROL POINT," filed Jun. 5, 2007 by Mahfuzur Rahman and Wonseok Kwon, herein incorporated by reference in its entirety.

BACKGROUND OF THE INVENTION

1. Field of the Invention

The present invention relates to home networking. More particularly, the present invention relates to synchronizing content between a content directory service and a control point in a home networking environment.

2. Description of the Related Art

Universal Plug and Play (UPnP) is a distributed, open networking architecture that allows devices to connect seamlessly and to simplify the implementation of networks in the home (data sharing, communications, and entertainment) and corporate environments. UPnP achieves this by defining and publishing UPnP device control protocols built upon open, Internet-based communication standards.

UPnP has grown in popularity of late in part due to the rise in popularity of media servers. Media servers are small computers that store multiple types of content (e.g., photos, music, videos, etc.). The content may then be streamed from a media server to one or more control points (e.g., iPod, television set, etc.).

As an example, a "Media Server" device might contain a significant portion of the homeowner's audio, video, and still-image library. In order for the homeowner to enjoy this content, the homeowner must be able to browse the objects stored on the Media Server, select a specific one, and cause it to be "played" on an appropriate rendering device.

For maximum convenience, it is highly desirable to allow the homeowner to initiate these operations from a variety of User Interface (UI) devices. In most cases, these UI devices will either be a UI built into the rendering device, or a stand-alone UI device such as a wireless PDA or tablet. In any case, it is unlikely that the homeowner will interact directly with the device containing the content (i.e. the homeowner won't have to walk over to the server device). In order to enable this capability, the service device needs to provide a uniform mechanism for UI devices to browse the content on the server and to obtain detailed information about individual content objects. This is the purpose of the Content Directory Service (CDS).

The Content Directory Service additionally provides a lookup/storage service that allows clients (e.g. UI devices) to locate (and possibly store) individual objects (e.g. songs, movies, pictures, etc) that the (server) device is capable of providing. For example, this service can be used to enumerate a list of songs stored on an MP3 player, a list of still-images comprising various slide-shows, a list of movies stored in a DVD-Jukebox, a list of TV shows currently being broadcast, a list of songs stored in a CD-Jukebox, a list of programs stored on a PVR (Personal Video Recorder) device, etc. Nearly any type of content can be enumerated via this Content Directory service. For those devices that contain multiple types of content (e.g. MP3, MPEG2, JPEG, etc), a single instance of the Content Directory Service can be used to enumerate all objects, regardless of their type.

SUMMARY OF THE INVENTION

In one embodiment, a method is performed at a control point (CP) in a network. An action is invoked to create a synchronization data structure on a media server that includes a content directory service (CDS) in the network, wherein the synchronization data structure includes a synchronization relationship describing a relationship between the CP and the CDS. Then an action is invoked to add synchronization pair information to one or more objects on the CDS. A change log is requested from the CDS. Then the change log is received from the CDS, wherein the change log contains information about changes to the one or more objects to which synchronization pair information for the CP was added.

DETAILED DESCRIPTION OF SPECIFIC EMBODIMENTS

Figure 1:
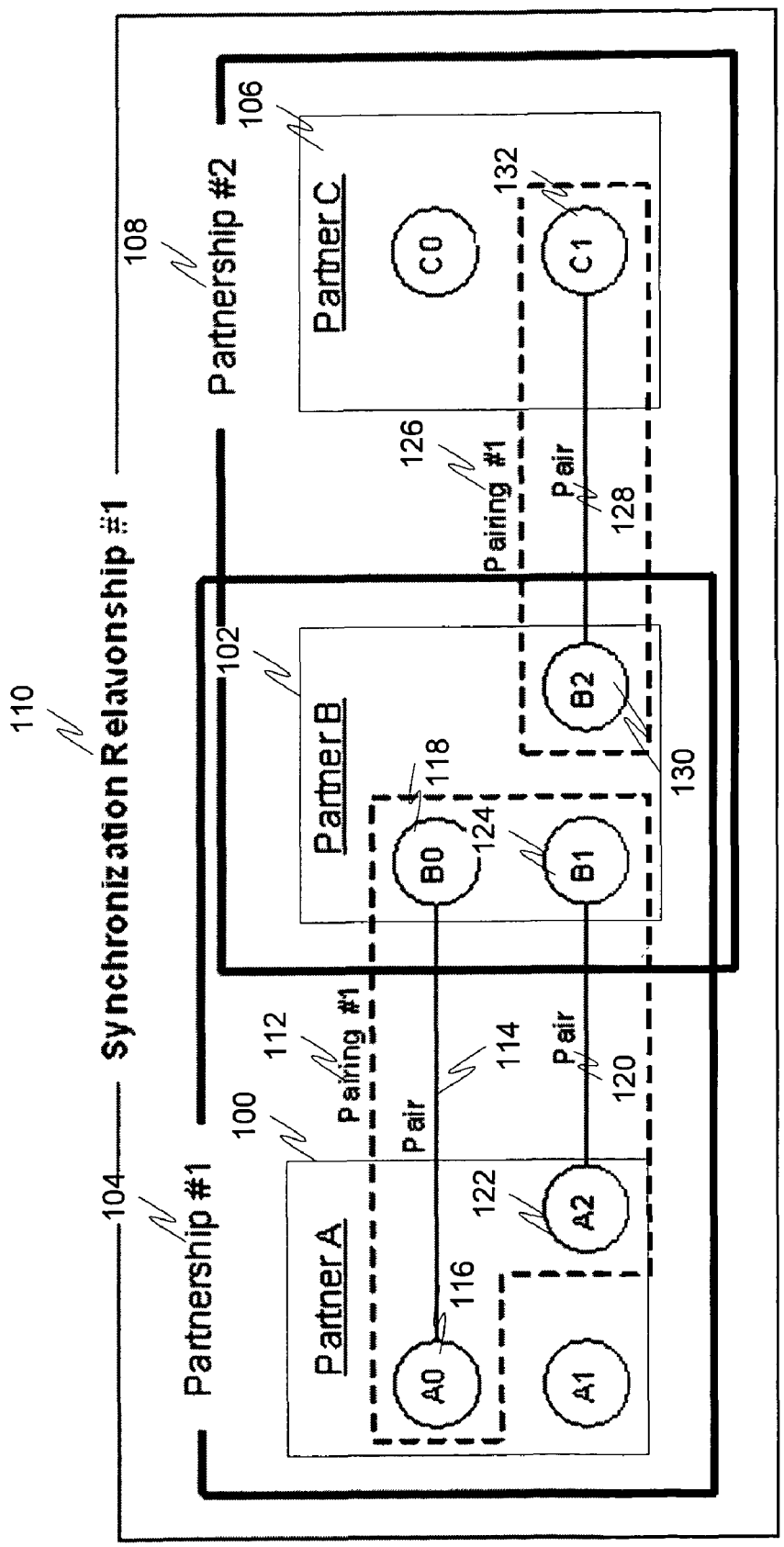
FIG. 1 is a diagram illustrating a synchronization relationship in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

It should be noted that the term "home networking" as used throughout this document refers to a type of network that is commonly used in homes to connect media devices. There is no requirement, however, that this type of networking actually be used in homes, as it has equal applicability for use in businesses or other entities. As such, the term "home networking" shall not be construed as limiting any embodiments of the present invention to use in a home.

Content Directory Service (CDS) supports the uploading and downloading of CDS objects. In order to transfer objects from one CDS to another CDS, the user searches or browses objects and selects them to indicate that the CDS should import or export them. This type of operation is acceptable to users when the transfer occurs once in awhile. However, this series of operations is cumbersome when it must occur regularly. For example, if the user wants to have the same music in a mobile device as well as in a music folder of a media server, it is inefficient for the user to browse through each of the objects every time some music items have changed.

UPnP CDS currently does not allow a CDS to register its interests to track changes to a set of CDS objects. The only possible way a UPnP control point learns of changes is by manually searching each changed object and all of its child objects (property-by-property) to determine which object(s) actually changed. When a CDS contains a large number of objects (e.g., thousands), this process can take a very long time. Additionally, when a control point (CP) is tracking a specific set of objects, often this work is wasted effort since the object(s) being tracked did not actually change. In other words, the control point has to perform a lot of unnecessary work simply to determine that nothing needs to be done. This is especially cumbersome in the case of finding deleted objects.

The present invention provides for content synchronization between a UPnP Content Directory Service and Control Point. The control point may register its interest to monitor changes, including deletion, of a set of objects maintained by a UPnP CDS and retrieve such changes from the CDS.

In one embodiment, a one-side synchronization data structure is introduced. This synchronization data structure contains a single synchronization relationship on a device whose CDS objects the control point wants to monitor. Once the synchronization data structure is created and object pair information is added to the CDS objects, the CDS begins keeping track of changes to the objects. A control point can then retrieve the change log for all the objects that are a part of the synchronization relationship. Once the change log is retrieved, the control point can then compare changes of objects with its internal database and update its internal database, hence synchronizing with the CDS. When a control point is no longer interested in the change log for objects that are a part of the synchronization relationship, the control point can delete the synchronization relationship.

In one embodiment of the present invention, the synchronization data structure contains a synchronization pair group, a synchronization partnership, and a synchronization relationship. The synchronization pair group is a data structure that identifies a group of synchronization pairs where identical synchronization policies will be applied. The actual synchronization pair information describing which object in the local CDS is paired with an object in the partner CDS is contained in the object itself as part of an object property. The synchronization partnership is a data structure that describes a synchronization operation between two specific CDSs. These two CDSs are called partners. A synchronization partnership contains multiple synchronization pair groups. A synchronization partnership also contains policy information that is applicable to all the pair groups contained within that partnership. If a pair group has its own policy information, then the pair group policy overrides the partnership policy for that specific pair group.

It should be noted that while CDS-CP synchronization is the focus of the present application, CDS-CDS synchronization is discussed throughout the document as it is a useful adjunct to CDS-CP synchronization and the same synchronization data structure can be utilized for both types of synchronizations.

A synchronization relationship is composed of one or more synchronization partnerships and each partnership is composed of one or more synchronization pairings.

FIG. 1 is a diagram illustrating a synchronization relationship in accordance with an embodiment of the present invention. Here, Partner A 100 and Partner B 102 form a first synchronization partnership 104. Partner B 102 and Partner C 106 form a second synchronization partnership 108. These two partnerships 104, 108 make up the synchronization relationship 110. Within the first synchronization partnership 104, a first pairing 112 contains two pairs where identical synchronization policies will be applied. The first pair 114 is between object 116 and object 118. The second pair 120 is between object 122 and object 124. Within the second synchronization partnership 108, a first pairing 126 contains one pair 128. This pair 128 is between object 130 and object 132.

A ContentSync service (CSS) may be enabled to aid in the management of the synchronization data structures. The CSS may keep a change log a part of a CDS object property, which describes which CDS objects are added, modified, or deleted since the last synchronization. Since synchronization enables interaction between CSSs, each service has a control point functionality that invokes actions to other CSSs to achieve synchronization of contents with each other.

Figure 2:
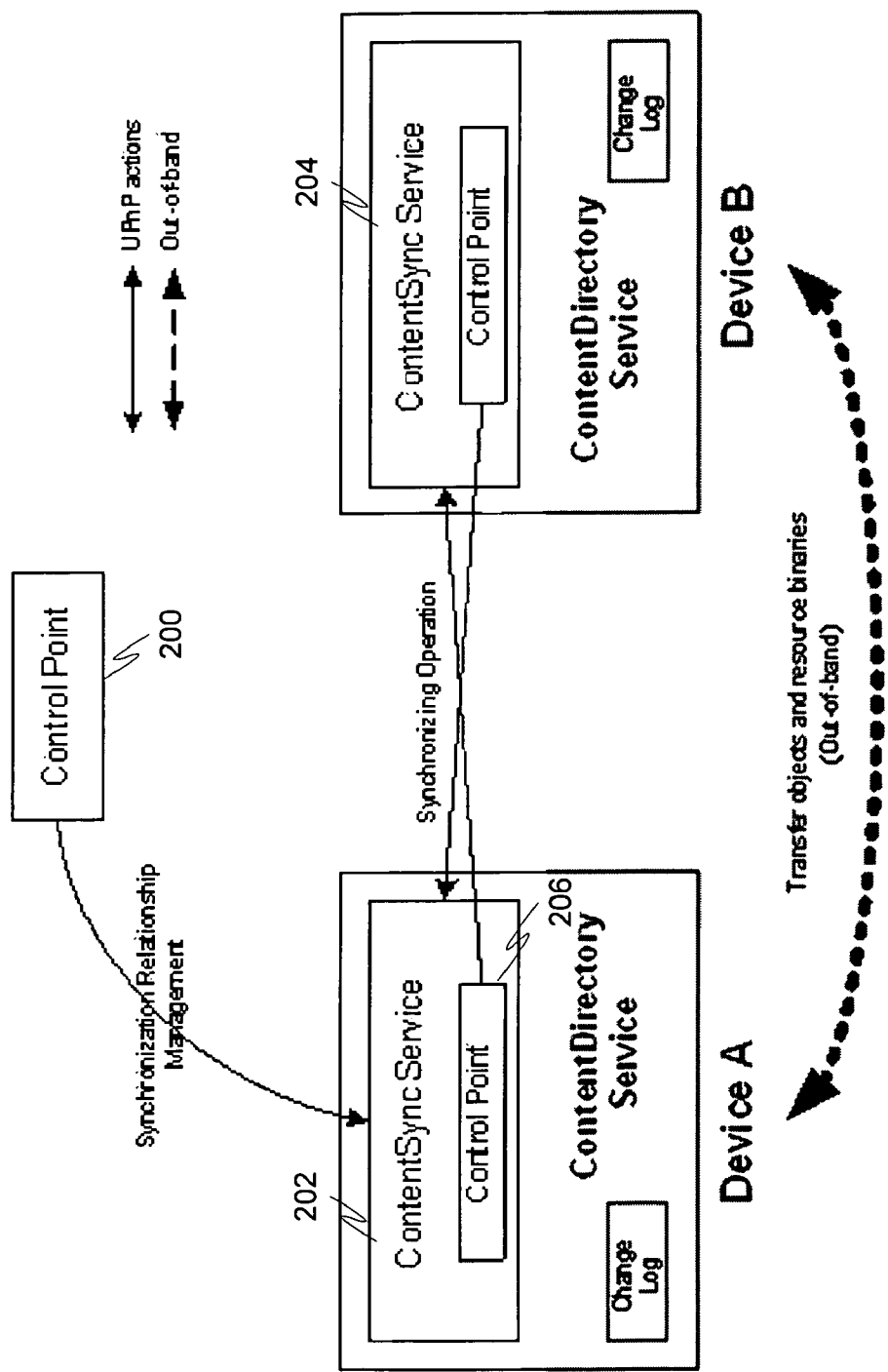
FIG. 2 is a diagram illustrating how synchronization is accomplished between two CSSs.

FIG. 2 is a diagram illustrating how synchronization is accomplished between two CSSs. A stand-alone control point 200 manages the synchronization between two CSSs 202, 204. This includes management of content synchronization data structures (i.e., creating, browsing, and deleting of synchronization data structures) and invocation of the synchronization operation. An embedded control point 206 in the CSS 202 has the role of performing the actual synchronization of objects which include retrieving the change log for objects that have changed, monitoring the status of the other CSS 204, and updating the synchronization data structure when an object is successfully synchronized.

Figure 3:
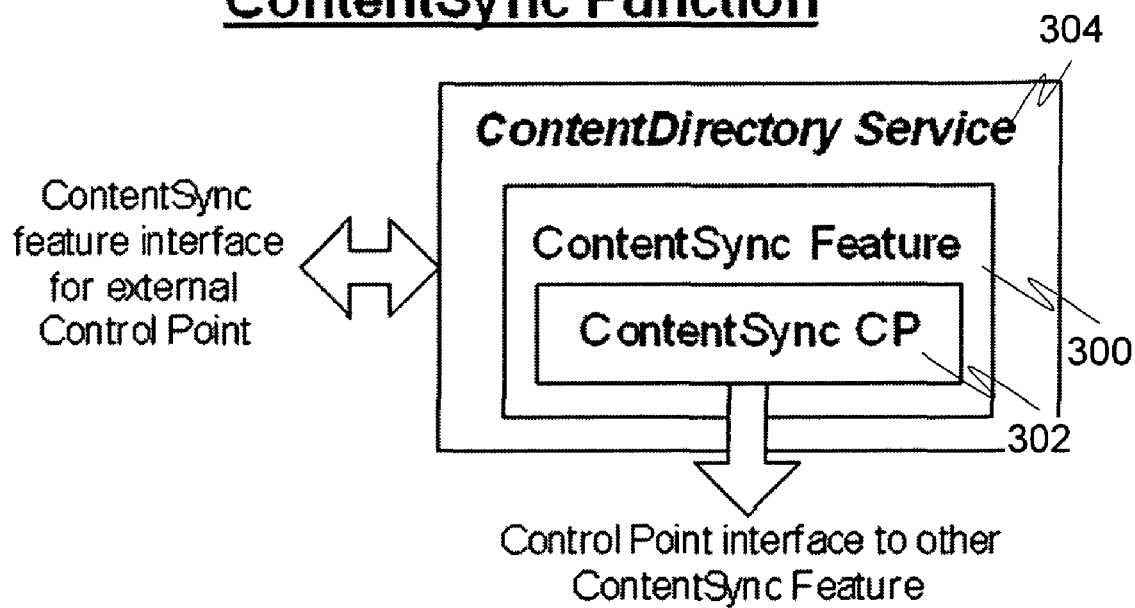
FIG. 3 is a diagram illustrating the Content Synchronization function in accordance with an embodiment of the present invention.

FIG. 3 is a diagram illustrating the Content Synchronization function in accordance with an embodiment of the present invention. As can be seen, this function is a combination of a ContentSync service 300 and a Content Sync CP 302 in a CDS 304. A ContentSync 300 service is responsible for managing synchronization data structure and performing synchronization operation with a partner device. The ContentSync CP 302 provides a Control Point 304 functionality that controls other ContentSync service running on the network.

In an embodiment of the present invention, a CDS object that is to be synchronized is called a synchronization object. A synchronization object has synchronization object pair information that represents the binding between an object in the local device and an object in the partner device referred to as remote object. Once synchronization object pair information is added to an object, the synchronization object pair information is updated whenever there is a change to that object. The synchronization object pair information allows a partner device to identify which property or resource has been changed for an object since the last synchronization for a given remote object. It is possible that an object that is to be synchronized does not have the corresponding remote object in the partner. In that case the remote object gets created in the partner during the synchronization operation.

For a given partnership, an object can have single synchronization object pair information. But if the object is involved in multiple partnerships, then it can have multiple synchronization object pairs, one for each partnership.

The synchronization data structure allows an object in one device to synchronize with an object in another device. Every syncable object in a CDS has synchronization object pair information that describes how the object gets synchronized with another object.

A synchronization relationship, partnership or pair group is identified by a unique ID. Regardless of disappearance/reappearance of this service on the network, the implementations that support ContentSync service implementations maintain the same value for these IDs in the CDS over its lifetime. The value once used is never re-used.

A synchronization policy indicates how synchronization partners that are involved in a synchronization relationship can exchange synchronization objects. In general, a synchronization policy indicates which device should provide metadata and resources to which device. In an embodiment of the present invention, only a "tracking" policy is defined.

A "tracking" synchronization policy is useful when synchronizing between a CDS and a non-CDS device. The actual synchronization operation for this policy is outside the scope of this document. In this policy, only the device having a CDS keeps track of the change log for synchronization objects. The device clears the change log by invocation of an action and starts keeping a new log from that point. The device stops keeping the change log when the synchronization relationship is destroyed. The behavior of a "tracking" synchronization policy is as follows.

A new object is automatically added to a synchronization pair group of its parent object if the parent object (container) of the newly added object is also a synchronization object and the automatic addition of new child object to synchronization pair group option in the policy of the parent object is set. However, descendent objects are not affected by this option (except direct child objects).

If a user wants to delete an object from the CDS permanently, the user may exclude that object from the relationship. The object may be created again by a synchronization operation if it is just deleted and not excluded from the synchronization relationship.

Figure 4:
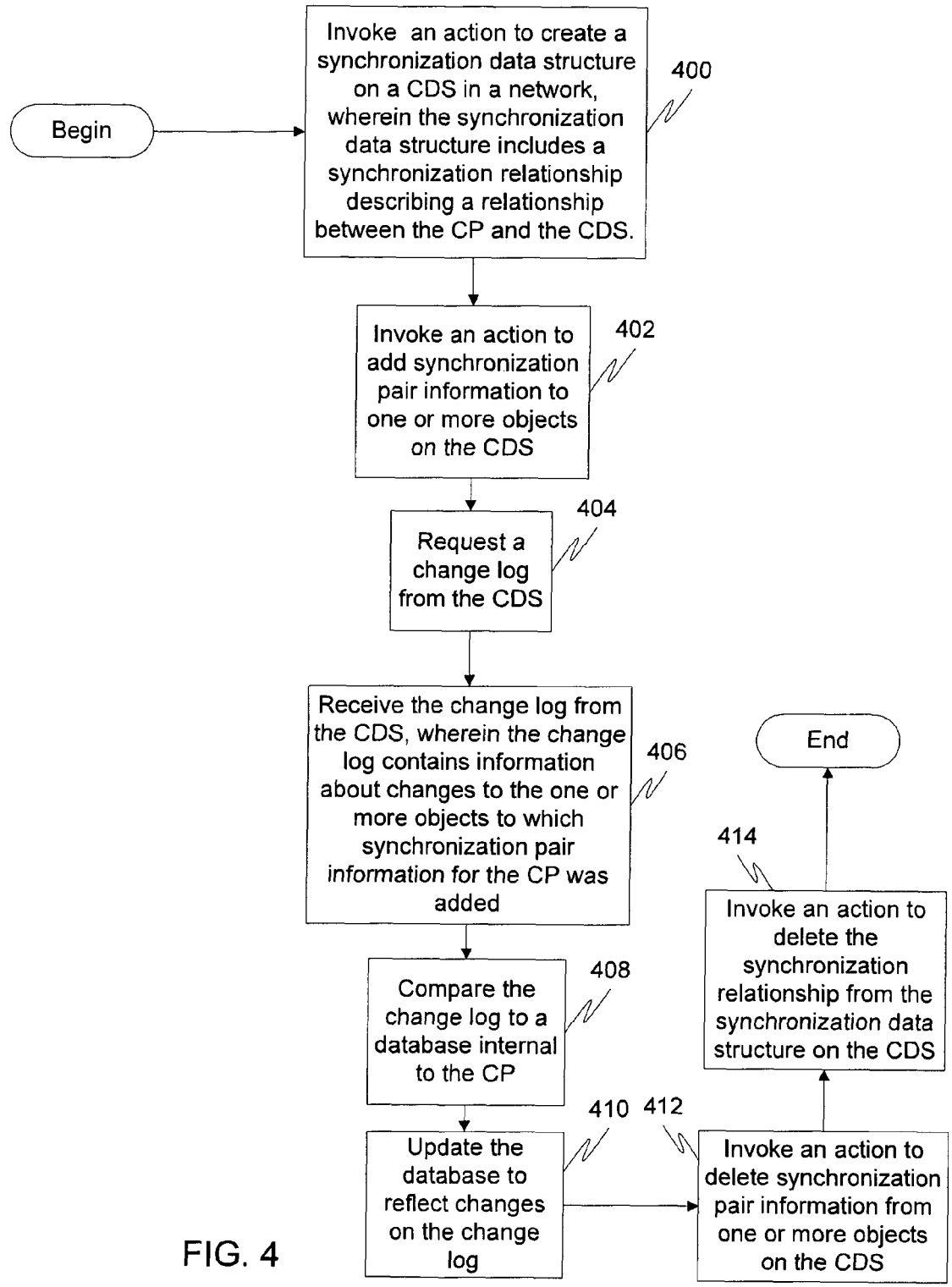
FIG. 4 is a flow diagram illustrating a method for synchronizing a control point and a content directory service in accordance with an embodiment of the present invention.

FIG. 4 is a flow diagram illustrating a method for synchronizing a control point and a content directory service in accordance with an embodiment of the present invention. This method may be performed at the control point. The CP may be located, for example, on a portable media device. The CDS may be located on a media server. Each step of the method may be performed in hardware, software, or any combination thereof.

At 400, an action is invoked to create a synchronization data structure on a media server including the CDS in a network, wherein the synchronization data structure includes a synchronization relationship describing a relationship between the CP and the CDS. At 402, an action is invoked to add synchronization pair information to one or more objects on the CDS. At 404, a change log is requested from the CDS. At 406, the change log may be received from the CDS, wherein the change log contains information about changes to the one or more objects to which synchronization pair information for the CP was added. At 408, the change log may be compared to a database internal to the CP. At 410, the database may be updated to reflect changes on the change log. At 412, an action to delete synchronization pair information from one or more objects on the CDS, may be invoked. At 414, an action to delete the synchronization relationship from the synchronization data structure on the CDS may be invoked.

Figure 5:
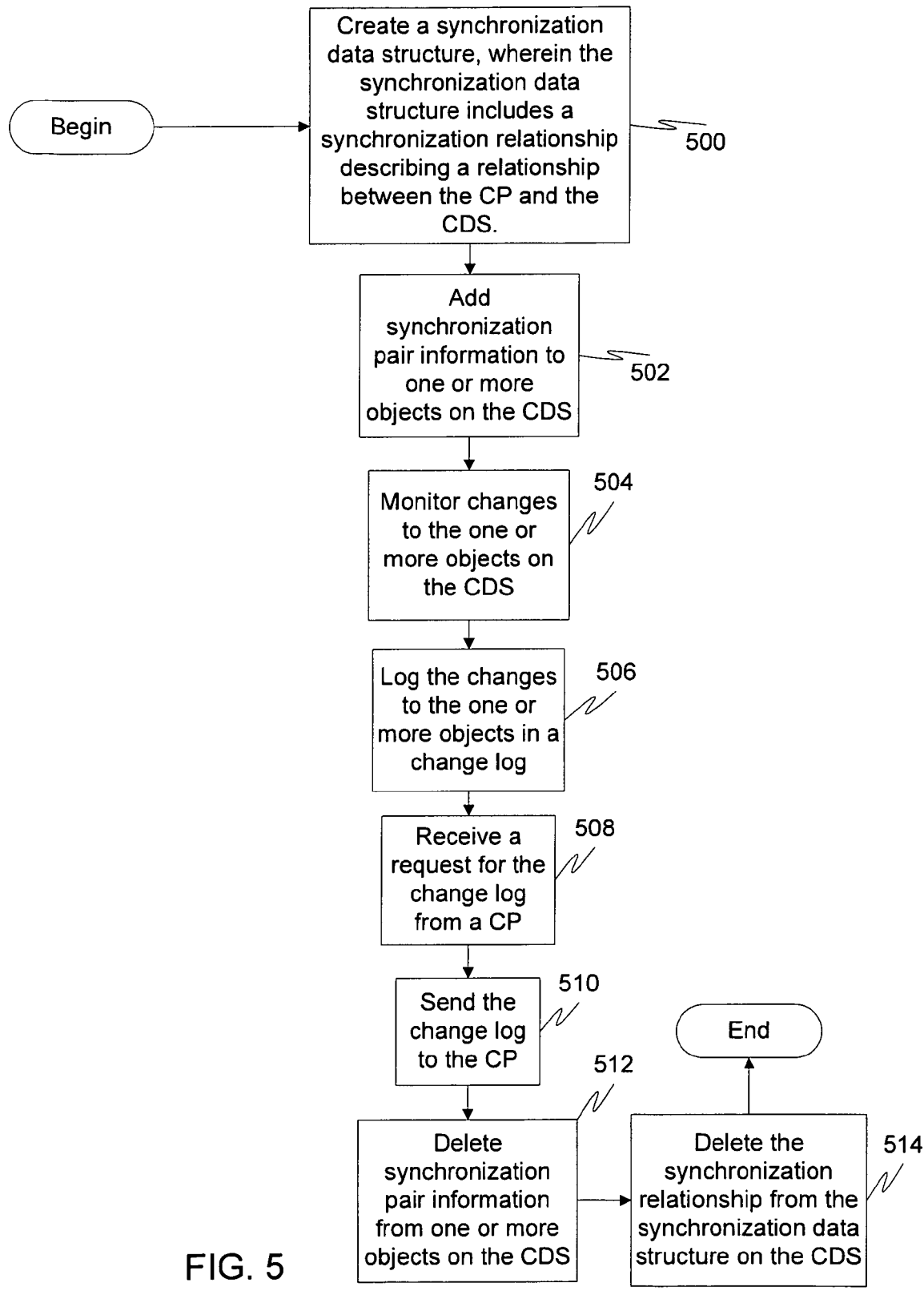
FIG. 5 is a flow diagram illustrating a method for synchronizing a control point and a content directory service in accordance with an embodiment of the present invention.

FIG. 5 is a flow diagram illustrating a method for synchronizing a control point and a content directory service in accordance with an embodiment of the present invention. This method may be performed at the content directory service. The CP may be located, for example, on a portable media device. The CDS may be located, for example, on a media server. Each step of the method may be performed in hardware, software, or any combination thereof.

At 500, a synchronization data structure is created, wherein the synchronization data structure includes a synchronization relationship describing a relationship between a CP and the CDS. This creating may be performed in response to a request from the CP. At 502, synchronization pair information is added to one or more objects on the CDS. This adding may be performed in response to a request from the CP. At 504, changes to the one or more objects on the CDS are monitored. At 506, the changes to the one or more objects are logged in a change log. It should be noted that steps 504 and 506 may be performed multiple times as changes accrue. At 508, a request for the change log may be received from a CP. At 510, the change log is sent to the CP. At 512, synchronization pair information may be deleted from one or more objects on the CDS. This deletion may be performed in response to a request from the CP. At 514, the synchronization relationship may be deleted from the synchronization data structure on the CDS. This deletion may be performed in response to a request from the CP.

Figure 6:
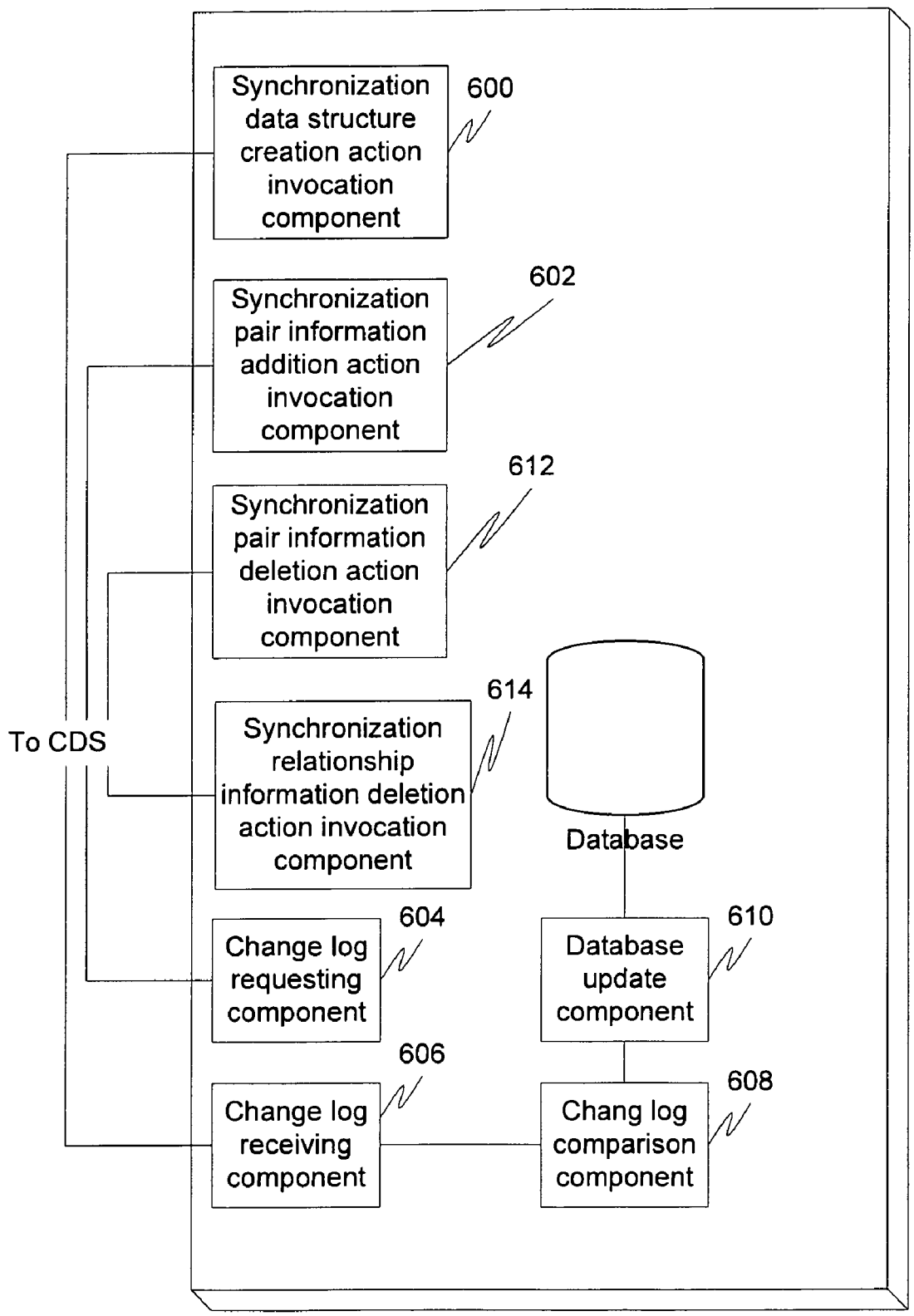
FIG. 6 is a block diagram illustrating a control point in accordance with an embodiment of the present invention.

FIG. 6 is a block diagram illustrating a control point in accordance with an embodiment of the present invention. Each element of this control point may be embodied in hardware, software, or any combination thereof. The elements will be described as "components," but one of ordinary skill in the art will recognize that these can be implemented in hardware or software modules. Additionally, these components may not be distinct, and in fact a component configured to perform a certain task may be the same component as one configured to perform another task.

A synchronization data structure creation action invocation component 600 may be configured to perform step 400 of FIG. 4. A synchronization pair information addition action invocation component 602 may be configured to perform step 402 of FIG. 4. A change log requesting component 604 may be configured to perform step 404 of FIG. 4. A change log receiving component 606 may be configured to perform step 406 of FIG. 4. A change log comparison component 608 may be configured to perform step 408 of FIG. 4. A database update component 610 may be configured to perform step 410 of FIG. 4. A synchronization pair information deletion action invocation component 612 may be configured to perform step 412 of FIG. 4. A synchronization relationship information deletion action invocation component 614 may be configured to perform step 414 of FIG. 4.

Figure 7:
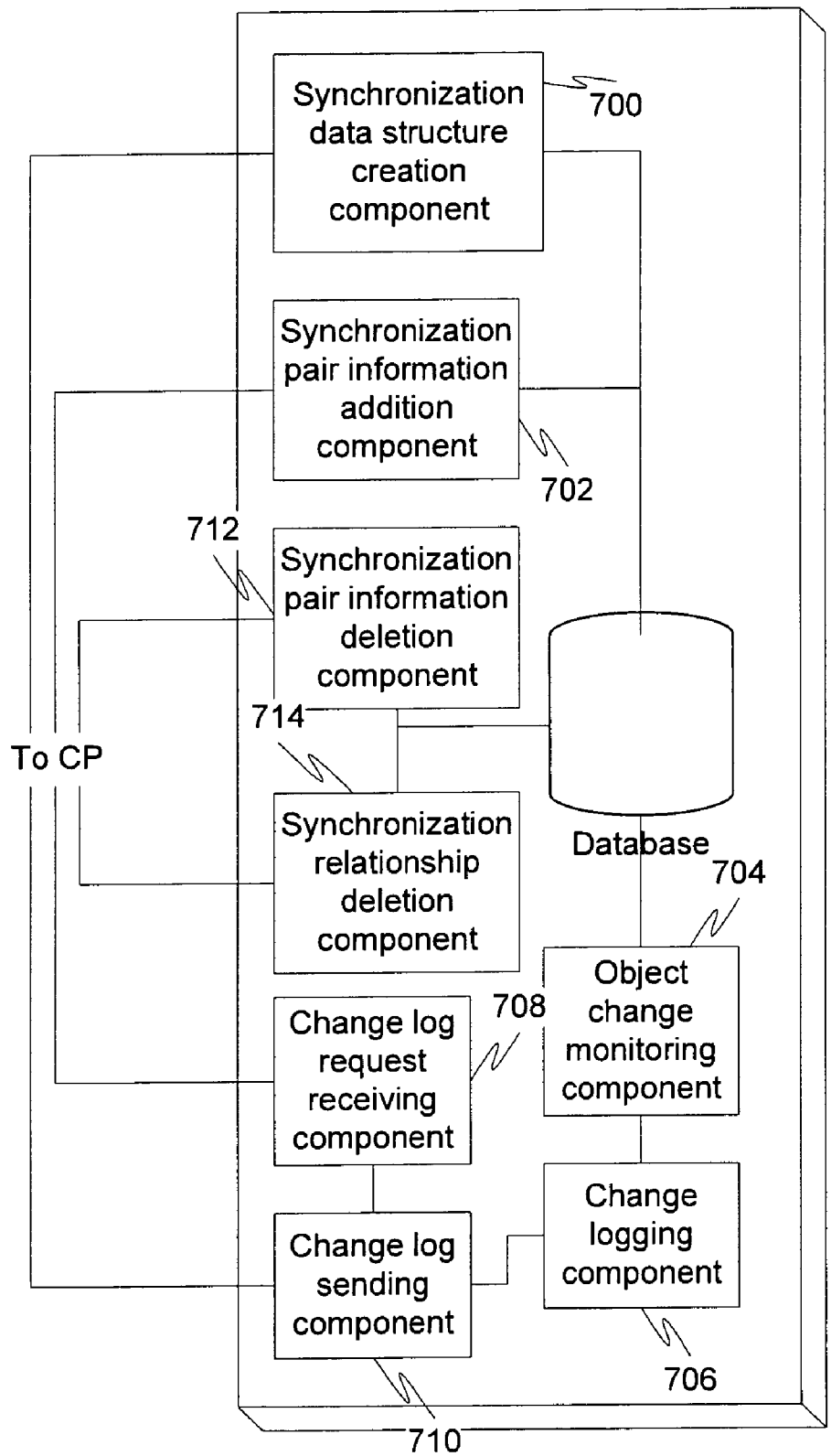
FIG. 7 is a block diagram illustrating a content directory service in accordance with an embodiment of the present invention.

FIG. 7 is a block diagram illustrating a content directory service in accordance with an embodiment of the present invention. Each element of this control point may be embodied in hardware, software, or any combination thereof. The elements will be described as "components," but one of ordinary skill in the art will recognize that these can be implemented in hardware or software modules. Additionally, these components may not be distinct, and in fact a component configured to perform a certain task may be the same component as one configured to perform another task.

A synchronization data structure creation component 700 may be configured to perform step 500 of FIG. 5. A synchronization pair information adding component 702 may be configured to perform step 502 of FIG. 5. An object change monitoring component 704 may be configured to perform step 504 of FIG. 5. A change logging component 706 may be configured to perform step 506 of FIG. 5. A change log request receiving component 708 may be configured to perform step 508 of FIG. 5. A change log sending component 710 may be configured to perform step 510 of FIG. 5. A synchronization pair information deletion component 712 may be configured to perform step 512 of FIG. 5. A synchronization relationship deletion component 714 may be configured to perform step 514 of FIG. 5.

A specific Extensible Markup Language (XML) implementation is presented below. It should be noted that this is merely one possible implementation, and nothing in this implementation should be construed as limiting the scope of the invention.

This synchronization policy may be included in the policy element in the ContentSync XML document which contains zero or more synchronization data structure and in the upnp:syncInfo::objectPair::policy property in a CDS object if overriding policy is necessary. The following example shows an XML fragment of the policy.

```
<policy>
    <syncType>tracking</syncType>
    <priorityPartnerID>1</priorityPartnerID>
    <autoObjAdd>1</ autoObjAdd >
<policy>
```

The root element, <policy>, contains zero or more elements, each of which represents a synchronization policy.

The following example shows a generalized "template" for the format of the policy XML document.

```
<?xml version="1.0"?>
<policy
    xmlns="urn:schemas-upnp-org:av:css"
    xmlns:xsd="http://www.w3.org/2001/XMLSchema"
    xmlns:xsi="http://www.w3.org/2001/XMLSchema-instance"
    xsi:schemaLocation="
        urn:schemas-upnp-org:av:cds-event
            http://www.upnp.org/schemas/av/css--v1-20070XXXX.xsd">
        <syncType>synchronization policy
type</syncType>syncDataUpdate
        <priority>Role of a partner</priority>
        <delProtection>Protect an object deletion</delProtection>
</policy>
```

A minimally complete synchronization data structure defines exactly one synchronization relationship, exactly one partnership within synchronization relationship and exactly one pairing within that partnership.

A minimally complete partnership data structure defines exactly one partnership (to be added to an existing synchronization relationship) and exactly one pairing within that partnership.

The synchronization between a CDS and a non-CDS (Control Point) is unidirectional and may comprise the following steps.

A UPnP Control Point creates a new synchronization data structure containing a single synchronization relationship on the device with which the control point wants to synchronize. The following XML document shows an example format of the synchronization data structure for CDS and Non-CDS synchronization.

```
<syncRelationship id="1cce93c2-6144-4093-9650-ae6c7ba28c91"
active="1"
        xmlns="urn:schemas-upnp-org:cs"
        xmlns:xsd="http://www.w3.org/2001/XMLSchema"
        xmlns:xsi="http://www.w3.org/2001/XMLSchema-instance"
        xsi:schemaLocation="urn:schemas-upnp-org:av:cds-event
            http://www.upnp.org/schemas/cs/cs-v1-20070XXXX.xsd">
    <title>ABC Electronic Program Guide</title>
    <partnership id="3fa8e9f8-ff21-47ee-90c8-7730793a613f" active="1">
        <partner id="1">
            <deviceUDN>e832a654-9c64-429b-9f34-
8f55278f73a7</deviceUDN>
            <serviceID>AcmeContentSync-001</serviceID>
        </partner>
        <partner id="2">
            <deviceUDN></deviceUDN>
            <serviceID></serviceID>
        </partner>
        <policy>
            <syncType>tracking<syncType>
            <priorityPartnerID>1</priorityPartnerID>
            <autoObjAdd>1</autoObjAdd>
        </policy>
        <pairGroup id="bca02e62-e9d6-454c-b1b2-a52e199e02e7"
active="1"/>
    </partnership>
</syncRelationship>
```

Once the synchronization data structure is created and pair information is added to the CDS objects, the CDS starts keeping track of changes to the objects.

A control point can retrieve the change log for all the objects that are part of the synchronization relationship by invoking the GetChangeLog( ) action. After retrieving the change log, a control point can invoke the ResetChangeLog( ) action to instruct the CDS whether to continue accumulating the change log once it has been retrieved or starts keeping new log after flushing out the old logs.

Once the change log is retrieved, the control point compares the changes to objects with its internal database and updates its internal database, hence synchronizing with the CDS.

When a control point is no longer interested in the change log for objects that are part of a synchronization relationship, the control point will delete the synchronization relationship by invoking the action DeleteSyncData( ).

The SyncChange state variable may contain an XML document identifying all changes that have occurred since the last time the SyncChange state variable was evented.

After the event notification message has been sent to all subscribed control points, the value of the SyncChange state variable is reset when an update to the SyncChange state variable becomes necessary i.e. when the next event occurs. The resulting value is a fresh XML document that contains a single element that represents the update (i.e. it contains the first update event following the distribution of the previous event message to all subscribers). Subsequently, additional update elements are added to the XML document until the current moderation period ends and the current value of the SyncChange state variable (i.e. the current event message) is propagated to all event subscribers.

The following example shows a generalized "template" for the format of the SyncChange state variable.

```
<?xml version="1.0"?>
<SyncChange
    xmlns="urn:schemas-upnp-org:av:css-event"
    xmlns:xsd="http://www.w3.org/2001/XMLSchema"
    xmlns:xsi="http://www.w3.org/2001/XMLSchema-instance"
    xsi:schemaLocation="
        urn:schemas-upnp-org:av:cds-event
            http://www.upnp.org/schemas/cs/css-v1-20070XXXX.xsd">
    <syncDataUpdate syncID="synchronization relationship or
        partnership
        or pairgroup ID of updated synchronization relationship"/>
    <syncObjUpdate objectID="object ID
        of updated synchronization object"/ >
</SyncChange>
```

A synchronization relationship (and its syncRelationship data structure) is identified by a globally unique syncRelationship@id element. A synchronization relationship is composed of one or more partnerships (see below). A synchronization relationship can be in an active or inactive state. An active state means that the synchronization relationship participates in a synchronization operation whereas an inactive synchronization relationship does not participate in a synchronization operation. The active state of a synchronization relationship is expressed by the syncRelationship@active element.

A partnership identifies two specific partner devices containing content that is synchronized during a synchronization operation. A partnership exists only between two sync partner devices. The partner devices are identified by their respective UDN values. Each partnership is identified by a globally unique partnership@id element.

Within every synchronization data structure (relationship, partnership, and PairGroup), a default policy is defined such that all dependent structures inherit that policy unless the dependent structure specifies a policy on its own. For example if policies are defined for a PairGroup and for a pair under that pairgroup, the pair policy will override the PairGroup policy. Similarly, if policies are defined for a partnership and a PairGroup under that partnership, then PairGroup policy will override partnership policy.

The partnership@updateID element can be used to determine whether locally cached partnership information has become stale. The partnership@updateID element value is increased by one whenever the partnership information is modified.

The following example shows a generalized "template" for the format of the A_ARG_TYPE_SyncData state variable, which defines a synchronization data structure.

```
<?xml version="1.0"?>
<ContentSync
    xmlns="urn:schemas-upnp-org:av:css-event"
    xmlns:xsd="http://www.w3.org/2001/XMLSchema"
    xmlns:xsi="http://www.w3.org/2001/XMLSchema-instance"
    xsi:schemaLocation="
            urn:schemas-upnp-org:av:cds-event
                http://www.upnp.org/schemas/cs/
                    css-v1-20070XXXX.xsd">
    <syncRelationship id="synchronization relationship ID"
        active="flag indicates whether a relationship is enabled or
                disabled"
        systemUpdateID="system update ID of the CDS at the
                time of change">
        <title>title of this synchronization relationship</title>
        <partnership id="synchronization partnership ID"
            active="flag indicates whether a partnership is enabled or
                disabled"
            updateID="uniquely assigned ID when a
                partnership is updated">
            <partner id="1">
                <deviceUDN>device UDN of the first
                    partner</deviceUDN>
                <serviceID>ID of a service of the first
                    partner</serviceID>
            </partner>
            <partner id="2">
                <deviceUDN>device UDN of the second
                    partner</deviceUDN>
                <serviceID>ID of a service of the second
                    partner</serviceID>
            </partner>
            <policy>synchronization policy in a partnership
                level</policy>
            <pairgroup id="synchronization pairgroup ID"
                active="flag indicates whether a pairgroup is enabled or
                        disabled">
                <policy>synchronization policy in a pairgroup
                    level</policy>
            </pairgroup>
        </partnership>
    </syncRelationship>
</ContentSync>
```

The A_ARG_TYPE_SyncPair state variable is introduced to provide type information for various arguments that contain a synchronization pair for a CDS object to be used in various actions.

The following illustrates a typical example of the A_ARG_TYPE_SyncPair state variable

```
<?xml version="1.0" encoding="UTF-8"?>
<syncInfo updateID="3">
    <pair
        syncRelationshipID="d8c9fa13-d79b-4a0c-999b-6ae2ff91a46d "
        partnershipID="a0e4d0a7-3378-4f17-8af2-3f7de3345dc6"
        pairgroupID="ba8e57de-7f66-4102-ae4b-31b96c86f173">
        <remoteObjID>B1</remoteObjID>
        <policy>
            <syncType>replace</syncType>
            <priorityPartnerID>1</priorityPartnerID>
        </policy>
        <status>MODIFIED</status>
    </pair>
    <pair
        syncRelationshipID="e884c276-c489-44f0-bcec-332450dab074"
        partnershipID="1ab3fef4-777e-496a-82ed-d2580cdafa75"
        pairgroupID="c1bc5bd7-0207-4226-beee-b528fe63a919">
        <remoteParentObjID>B2</remoteParentObjID>
        <status>NEW</status>
    </pair>
</syncInfo>
```

The A_ARG_TYPE_SyncID state variable is introduced to provide type information for various action arguments that uniquely identify a synchronization relationship, or a partnership or a pairgroup.

The A_ARG_TYPE_ObjectID state variable is introduced to provide type information for various action arguments that uniquely identify a CDS object.

The A_ARG_TYPE_ChangeLog state variable is introduced to provide type information for the ChangeLog argument in the GetChangeLog( ) action.

A change log is a list of CDS objects represented by a DIDL-Lite XML document with the extension in this specification. The change log contains the CDS object which has been changed since the last synchronization operation. When the change log is returned as a response of the GetChangeLog( ) action, the change log contains only the changed CDS object which is bound to the specific synchronization relationship or partnership or pairgroup.

The A_ARG_TYPE_Index state variable is introduced to provide type information for an argument in various actions. Arguments specify an offset into an arbitrary list of objects (change log).

The A_ARG_TYPE_Count state variable is introduced to provide type information for an argument in various actions. Arguments specify an ordinal number of arbitrary objects.

The A_ARG_TYPE_ResetObjectList state variable is introduced to provide type information for an argument that contains a list of synchronization objects of which the change log will be cleaned.

Example

```
<ResetObjectList>
    <object id="A1" remoteObjID="32" updateID="2"/>
    <object id="A72" remoteObjID="9547" updateID="4"/>
</ResetObjectList>
```

The following example shows a generalized "template" for the format of the A_ARG TYPE_ResetObjectList state variable.

```
<?xml version="1.0"?>
<ResetObjectList
    xmlns="urn:schemas-upnp-org:av:css-event"
    xmlns:xsd="http://www.w3.org/2001/XMLSchema"
    xmlns:xsi="http://www.w3.org/2001/XMLSchema-instance"
    xsi:schemaLocation="
        urn:schemas-upnp-org:av:css
            http://www.upnp.org/schemas/cs/css-v1-20070XXXX.xsd">
    <objectID
        id="object ID"
        remoteObjID="object ID of a partner paired with this object"
        updateID="uniquely assigned ID when the object is changed">
    </objectID>
</ResetObjectList>
```

The AddSyncData( ) action creates either a new synchronization relationship template, or a new partnership template within an existing relationship or a new pairgroup template within an existing partnership.

When a device receives the AddSyncData( ) action from a stand-alone control point to create a new synchronization relationship, the device generates three IDs to identify the synchronization relationship, the partnership and the pairgroup for the minimally complete synchronization data structure. The generated IDs conform to the requirement of A_ARG TYPE_SyncID state variable.

When a stand-alone control point is adding a synchronization relationship, the value of the SyncID input argument is set to the empty string. While adding a partnership, the SyncID argument will contain the SyncID of an existing synchronization relationship where the partnership information will be added. Likewise, while adding a pairgroup, the SyncID argument will contain the SyncID of an existing partnership where the pairgroup information will be added.

The ModifySyncData( ) action modifies either a synchronization relationship, or a partnership within an existing relationship or a pairgroup within an existing partnership.

If the ActionCaller argument specifies a device UDN then this action is invoked by a partner device and the caller does not need to disseminate synchronization data structure (SyncData) to the partner device. However, if the ActionCaller argument is empty string, the device disseminates the synchronization data structure (SyncData) to the partner device, by invoking the ModifySyncData( ) action on the partner.

To prevent updating synchronization data structure by stale data, the SyncData input argument contains the @updateID attribute of a partnership or pairgroup when the partnership or pairgroup level is modified.

If the modification would result in a synchronization relationship that is no longer valid, the ModifySyncData( ) action fails without any change and return an appropriate error code.

The DeleteSyncData( ) action deletes either a synchronization relationship, or a partnership within an existing synchronization relationship or a pairgroup within an existing partnership. The SyncID argument of the action DeleteSyncData( ) identifies the synchronization relationship or the partnership or the pairgroup to be deleted.

If the ActionCaller argument specifies a device UDN then this action is invoked by a partner device and the caller does not need to inform the partner device of the deletion. However, if the ActionCaller argument is null, the device informs the partner device of the deletion, by invoking the DeleteSyncData( ) action on the partner.

A deletion of a partnership or a pairgroup is allowed even when one of the partner devices is not in the network. In this case, the other partner device gets updated synchronization data structure by invoking the ExchangeSyncData( ) action before performing any synchronization operation when the device rejoins the network.

When the last pairgroup within an existing partnership is deleted, the partnership is deleted as well.

Likewise, when the last partnership within an existing relationship is deleted, the relationship is deleted. The GetSyncData( ) action returns the synchronization data structure identified by the SyncID input argument. If the value of the action argument SyncID identifies a synchronization relationship then the SyncData output argument contains the entire synchronization data structure for that synchronization relationship including all partnerships within that relationship and all pairgroups for each partnership contained within that relationship. If the value of the action argument SyncID identifies a partnership, then the SyncData output argument contains the synchronization data structure for that partnership including all pairgroups contained within that partnership. If the value of the action argument SyncID identifies a pairgroup, then the SyncData output argument contains the synchronization data structure for the identified pairgroup. If the value of the action argument SyncID is the empty string, then the SyncData output argument contains the synchronization data structure for all synchronization relationships.

The AddSyncPair( ) action adds synchronization pair information into a CDS object. If the ActionCaller argument specifies a device UDN then this action is invoked by a partner device and the caller does not need to disseminate pair information to the partner device. However, if the ActionCaller argument is null then the device that receives this action invokes the AddSyncPair( ) action on the partner device to maintain identical pair information on the partner.

The ObjectID input argument of the action identifies the object to which the pairgroup information is being added.

The SyncPair input argument includes an XML fragment containing the pair information.

There are two possible scenarios that may occur while invoking this action while adding pairgroup information for an object:

Both objects that are part of the pair already exist (Type 1):
The object@id value of the remote object are included in the upnp:pair::remoteObjID element.

Object on only one of the partner exists (Type 2 and Type 3):
The partner device does not have a corresponding partner object for the pair. The object will be created on the partner device during the first synchronization operation. The rules to create an object on the partner device are as follows:
  If the parent container object under which the new object item will be created exists in the partner device, the upnp:pair::remoteParentObjID element includes the object@id value of the parent container object.
  If the parent container object does not exist in the partner and the container object under which the new object item will be located is to be created from the local container object, the upnp:pair::virtualRemoteParentObjID element includes the object@id value of the local container (i.e. this container object will be the parent object in the partner device.) This parent container object has a pair in the same partnership as well. During the synchronization operation, if a local device determines that no corresponding object exist in the local device for the pair, the device creates a new object in the local device and updates the upnp:pair::RemoteObjID by assigning the value of the object ID of the newly created object. The device then deletes the upnp:pair::remoteParentObjID or the upnp:pair::virtualRemoteParentObjID.

An object can be part of multiple pairgroups within a single synchronization relationship. But, the following rules apply in such cases:
  If the synchronization policy is 'replace', the object that is a source is allowed to have multiple pairs.
  If the synchronization policy is 'blend', the object with precedence is allowed to have multiple pairs.
  If the synchronization policy is 'merge', only single pairgroup is allowed.

The ModifySyncPair( ) action modifies the synchronization pair property for a CDS object. This modification includes only the policy information. If the ActionCaller argument specifies a device UDN then this action is invoked by a partner device and the caller does not need to disseminate pairgroup information to the partner device. However, if the ActionCaller argument is null then the action is called by a stand-alone control point and to maintain identical pair information on the partner device, the device disseminates the pair information included in the SyncPair to the partner device, by invoking the ModifySyncPair( ) action on the partner.

The ObjectID argument identifies the object whose pair information is to be modified. The SyncPair input argument includes an XML fragment containing the pair information to be added.

The SyncPair input argument includes an XML fragment containing the pair information. In the SyncPair argument, upnp:pair@syncRelationshipID, upnp:pair@partnershipID and upnp:pair@pairgroupID MUST be specified and valid. A SyncPair also includes either a upnp:pair::remoteObject or a upnp:pair::remoteParentPair or a upnp::virtualRemoteParentObjID is specified.

Where the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method comprising:
invoking, at a control point (CP) in a network, an action to create a synchronization data structure on a media server containing a content directory service (CDS) in the network, wherein the synchronization data structure includes a unique synchronization relationship describing each unique CP-CDS pair;
invoking, at the CP, an action to add synchronization pair information to one or more objects on the CDS, wherein the action to add synchronization pair information causes a change log to be created for the CP on the CDS;
requesting, at the CP, the change log from the CDS;
requesting synchronization between the CDS and the CP; and
receiving the change log from the CDS, wherein the change log contains information about changes to one or more objects on the CDS as identified by the synchronization pair information for the CP, wherein the changes were detected and added to the change log prior to synchronization being requested.

2. The method of claim 1, wherein the invoking steps and the request and receiving steps are performed through a content synchronization service (CSS).

3. The method of claim 1, further comprising:
invoking, at the CP, an action to delete synchronization pair information from one or more objects on the CDS.

4. The method of claim 1, further comprising:
invoking, at the CP, an action to delete the synchronization relationship from the synchronization data structure on the media server.

5. The method of claim 1, further comprising:
comparing the change log to a database internal to the CP; and
updating the database to reflect changes on the change log.

6. The method of claim 1, wherein the CP is located on a portable media device.

7. The method of claim 1, wherein the CDS is located on a media server.

8. A method comprising:
creating, at a media server containing a CDS in the network, a synchronization data structure, wherein the synchronization data structure includes a unique synchronization relationship for each unique CP-CDS pair;
adding synchronization pair information to one or more objects on the CDS;
monitoring changes to the one or more objects on the CDS in response to the adding of synchronization pair information to one or more objects on the CDS;
logging the changes to the one or more objects in a change log;
receiving a synchronization request after the logging has occurred;
sending the change log to the CP in response to the synchronization request.

9. The method of claim 8, wherein the creating is performed in response to a request from the CP.

10. The method of claim 8, further comprising:
deleting synchronization pair information from one or more objects on the CDS.

11. The method of claim 8, further comprising:
deleting the synchronization relationship from the synchronization data structure on the CDS.

12. A control point (CP) comprising:
a component configured to invoke, an action to create a synchronization data structure on a media server containing a CDS, wherein the synchronization data structure includes a different synchronization relationship describing each unique CP-CDS pair;
a component configured to invoke an action to add synchronization pair information to one or more objects on the CDS, wherein the action to add synchronization pair information causes a change log to be created for the CP on the CDS;
a component configured to request the change log from the CDS;
a component configured to request synchronization between the CDS and the CP;
a component configured to receive the change log from the CDS, wherein the change log contains information about changes to one or more objects on the CDS as identified by the synchronization pair information for the CP, wherein the changes were detected and added to the change log prior to synchronization being requested; and
a processor configured to interact with the other components of the control point.

13. The CP of claim 12, further comprising:
a component configured to invoke, at the CP, an action to delete synchronization pair information from one or more objects on the CDS.

14. The CP of claim 12, further comprising:
a component configured to invoke, at the CP, an action to delete the synchronization relationship from the synchronization data structure on the media server.

15. The CP of claim 12, further comprising:
a component configured to compare the change log to a database internal to the CP; and
a component configured to update the database to reflect changes on the change log.

16. The CP of claim 12, wherein the control point is located on a portable media device.

17. The CP of claim 12, wherein the CDS is located on a media server.

18. A content synchronization service (CSS) comprising:
a component configured to create a synchronization data structure, wherein the synchronization data structure includes a synchronization relationship describing a unique relationship for each unique CP-CDS pair;
a component configured to add synchronization pair information to one or more objects on the CDS;
a component configured to monitor changes to the one or more objects on the CDS in response to the adding of synchronization pair information to one or more object on the CDS;
a component configured to log the changes to the one or more objects in a change log;
a component configured to receive a synchronization request after the logging has occurred
a component configured to send the change log to the CP in response to the synchronization request; and
a processor configured to interact with the other components of the CSS.

19. The CSS of claim 18, wherein the CSS is communicatively coupled to the CP such that the creating of the synchronization data structure is performed in response to a request from the CP.

20. The CSS of claim 18, further comprising:
a component configured to delete synchronization pair information from one or more objects on the CDS.

21. The CSS of claim 18, further comprising:
a component configured to delete the synchronization relationship from the synchronization data structure.

22. A system comprising:
a media server comprising:
a content directory service (CDS);
a content synchronization service (CSS) comprising:
a component configured to create a synchronization data structure, wherein the synchronization data structure includes a synchronization relationship describing a unique relationship for each unique control point (CP)-CDS pair;
a component configured to add synchronization pair information to one or more objects on the CDS;
a component configured to monitor changes to the one or more objects on the CDS in response to the adding of synchronization pair information to the one or more objects on the CDS;
a component configured to log the changes to the one or more objects in a change log;
a component configured to receive a synchronization request after the logging has occurred;
a component configured to send the change log to a CP in response to the synchronization request; and
a processor configured to interact with the other components of the CSS;
the control point (CP) comprising:
a component configured to invoke an action to create a synchronization data structure on a media server containing a CDS, wherein the synchronization data structure includes a different synchronization relationship describing each unique CP-CDS pair;
a component configured to invoke an action to add synchronization pair information to one or more objects on the CDS;
a component configured to request a change log from the CDS;
a component configured to request synchronization between the CDS and the CP;
a component configured to receive the change log from the CDS, wherein the change log contains information about changes to one or more objects on the CDS as identified by the synchronization pair information for the CP, wherein the changes were detected and added to the change log prior to synchronization being requested; and
a processor configured to interact with the other components of the control point.

23. The system of claim 22, further comprising:
a second control point comprising:
a component configured to invoke an action to create a second synchronization data structure on the media server, wherein the second synchronization data structure includes a second synchronization relationship describing a relationship between the second control point and the CDS.

24. The system of claim 23, wherein the second control point further comprises:
a component configured to request a second change log from the CDS; and a component configured to receive the second change log from the CDS, wherein the second change log contains information about changes to one or more objects to which synchronization pair information for the second control point was added.

25. The system of claim 22, wherein the synchronization data structure contains a synchronization policy.

26. The system of claim 25, wherein the synchronization policy is stored in an Extensible Markup Language (XML) document.

* * * * *